US 9,242,298 B2

(12) United States Patent
Roundhill

(10) Patent No.: US 9,242,298 B2
(45) Date of Patent: Jan. 26, 2016

(54) METHOD AND SYSTEM FOR PREPARING SHAPED PARTICLES

(71) Applicant: Empire Technology Development LLC, Wilmington, DE (US)

(72) Inventor: David Max Roundhill, Seattle, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 285 days.

(21) Appl. No.: 13/789,010

(22) Filed: Mar. 7, 2013

(65) Prior Publication Data

US 2013/0340894 A1 Dec. 26, 2013

(30) Foreign Application Priority Data

Jun. 26, 2012 (WO) ................ PCT/US2012/044204

(51) Int. Cl.
*B22F 9/12* (2006.01)
*B22F 1/02* (2006.01)
*C09D 11/52* (2014.01)
*B22F 1/00* (2006.01)

(52) U.S. Cl.
CPC ... *B22F 9/12* (2013.01); *B22F 1/02* (2013.01); *C09D 11/52* (2013.01); *B22F 1/0018* (2013.01); *B22F 1/0088* (2013.01); *B22F 2999/00* (2013.01)

(58) Field of Classification Search
CPC ........ B22F 1/02; B22F 1/0018; B22F 1/0088; B22F 9/12; B22F 2201/03; B22F 2201/10; B22F 2202/11; C09D 11/52
See application file for complete search history.

(56) References Cited

U.S. PATENT DOCUMENTS

| 5,104,695 A | 4/1992 | Greer et al. |
| 6,676,727 B2 | 1/2004 | Pozarnsky |
| 6,689,192 B1 | 2/2004 | Phillips et al. |
| 2003/0025253 A1 | 2/2003 | Popov et al. |
| 2003/0145681 A1* | 8/2003 | El-Shall et al. ................ 75/345 |
| 2004/0118287 A1 | 6/2004 | Jaffe et al. |
| 2006/0251584 A1 | 11/2006 | Nagare et al. |
| 2007/0044513 A1 | 3/2007 | Kear et al. |

(Continued)

FOREIGN PATENT DOCUMENTS

| EP | 1 881 085 | 1/2008 |
| GB | 2 478 269 | 9/2011 |

OTHER PUBLICATIONS

"Ferrier Wire Goods Company Limited," Products, (2005) accessed at https://web.archive.org/web/20120424173449/http://www.ferrierwire.com/products.asp on Feb. 3, 2015, 12 pages.

(Continued)

*Primary Examiner* — Lois Zheng
(74) *Attorney, Agent, or Firm* — Foley & Lardner LLP

(57) ABSTRACT

The present technology provides an illustrative method for preparing shaped nanoparticles. The method includes passing a metal vapor to a shaping apparatus and condensing the metal vapor within the shaping apparatus to form selectively-shaped metal nanoparticles. The method may also include forming the metal vapor by heating a bulk metal. In an embodiment, the shaping apparatus comprises a mesh separator that include a plurality of nano-sized, square-shaped pores or a plurality of shaping cups that includes a plurality of recesses.

13 Claims, 8 Drawing Sheets

(56) References Cited

U.S. PATENT DOCUMENTS

| | | | |
|---|---|---|---|
| 2008/0108005 A1 | 5/2008 | Carpenter |
| 2008/0274344 A1 | 11/2008 | Vieth et al. |
| 2010/0021985 A1 | 1/2010 | Mason |
| 2010/0054981 A1 | 3/2010 | Liu |
| 2010/0224318 A1 | 9/2010 | Morita et al. |
| 2011/0127442 A1 | 6/2011 | Neff et al. |

OTHER PUBLICATIONS

"Hillside Wire Cloth: Extra Fine Wire Cloth," (1999) accessed at https://web.archive.org/web/20120510004534/http://www.hillsidewirecloth.com/specs2.html on Feb. 3, 2015, 2 pages.

"Introduction to Nanotechnology—Metal Nanoparticles," downloaded Jan. 13, 2013 from http://nanogloss.com/nanoparticles/metal-nanoparticles/#axzz1aJUW8Mwx, 4 pp.

Chang et al., "Synthesis and characterization of ZnO nanoparticles having prism shape by a novel gas condensation process," *Rev. Adv. Mater. Sci.*, Mar. 29, 2008, vol. 18, pp. 734-743.

Intl. Search Report and Written Opinion mailed on Nov. 5, 2012 for Intl. Pat. Appln. No. PCT/US2012/044204, 13 pp.

Tjong et al., "Nanocrystalline materials and coatings," *Material Science and Engineering R 45*, Aug. 10, 2004, 89 pp. (See, pp. 17, 19 and 20).

* cited by examiner

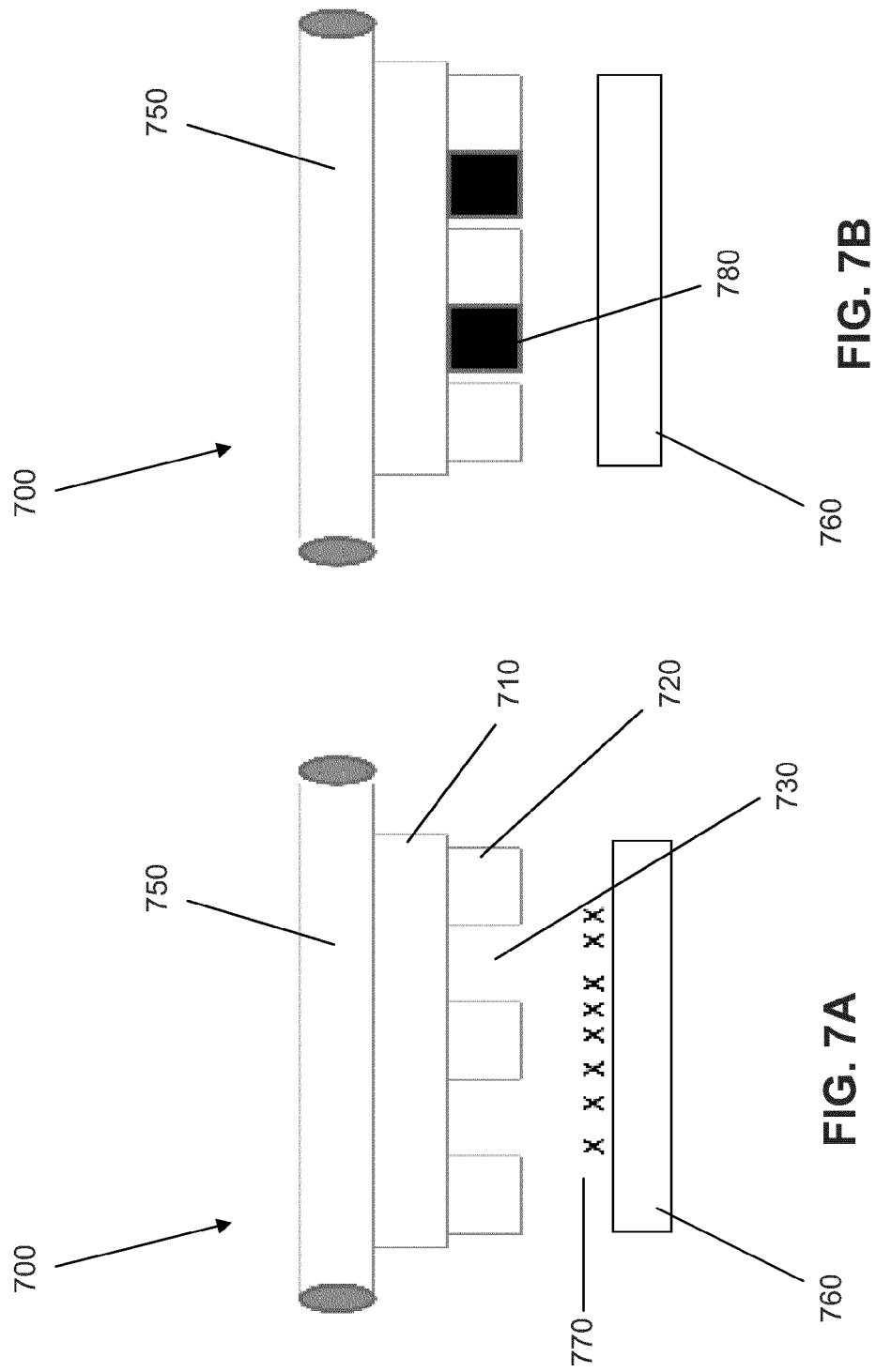

METHOD AND SYSTEM FOR PREPARING SHAPED PARTICLES

CROSS-REFERENCE TO RELATED APPLICATIONS

The present application claims the benefit of International Application Serial No. PCT/US2012/044204, filed on Jun. 26, 2012, the entire disclosure of which is incorporated herein by reference for any and all purposes in its entirety as if fully set forth herein.

BACKGROUND

The following description is provided to assist the understanding of the reader. None of the information provided or references cited is admitted to be prior art.

Metallic nanoparticle inks can be printed and cured to generate conductive printed electronics patterns. In traditional processes, the curing of the metallic nanoparticle inks involves forming a very large number of covalent intermetallic bonds between the various printed metal nanoparticles. The goal of this curing is to obtain a structure that is as close to identical as possible to that of the desired pure metal.

SUMMARY

The present technology provides an illustrative method for preparing shaped nanoparticles. The method includes passing a metal vapor to a shaping apparatus and condensing the metal vapor within the shaping apparatus to form selectively-shaped metal nanoparticles. The method may also include forming the metal vapor by heating a bulk metal. In an embodiment, the shaping apparatus comprises a mesh separator that includes molybdenum or tungsten and further includes a plurality of nano-sized, square-shaped pores.

An illustrative method for preparing shaped nanoparticles may also include passing the condensing metal vapor through a plurality of nano-sized, square-shaped pores of the mesh separator such that the selective-shaped metal nanoparticles are formed within the plurality of nano-sized, square-shaped pores of the mesh separator. The shaping apparatus may include a plurality of shaping cups configured to capture the metal vapor, such that the metal vapor is condensed within the plurality of shaping cups. The plurality of shaping cups may be square-shaped.

In an embodiment, the plurality of shaping cups are connected to a rotation mechanism configured to rotate the plurality of shaping cups. The method for preparing shaped nanoparticles may further include rotating the plurality of shaping cups from a face-down position to a face-up position and collecting the selectively-shaped metal nanoparticles from the plurality of shaping cups when the plurality of shaping cups are in the face-up position.

The present technology provides an illustrative system for producing shaped nanoparticles. The system includes a reactor configured to generate a metal vapor and a shaping apparatus configured to receive the metal vapor. The system further includes a cooling gas inlet configured to introduce an inert gas to the metal vapor such that the metal vapor condenses within the shaping apparatus to form selectively-shaped metal nanoparticles.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 7A-7D depict a set of rotating shaping cups in accordance with an illustrative embodiment.

DETAILED DESCRIPTION

Figure 1:
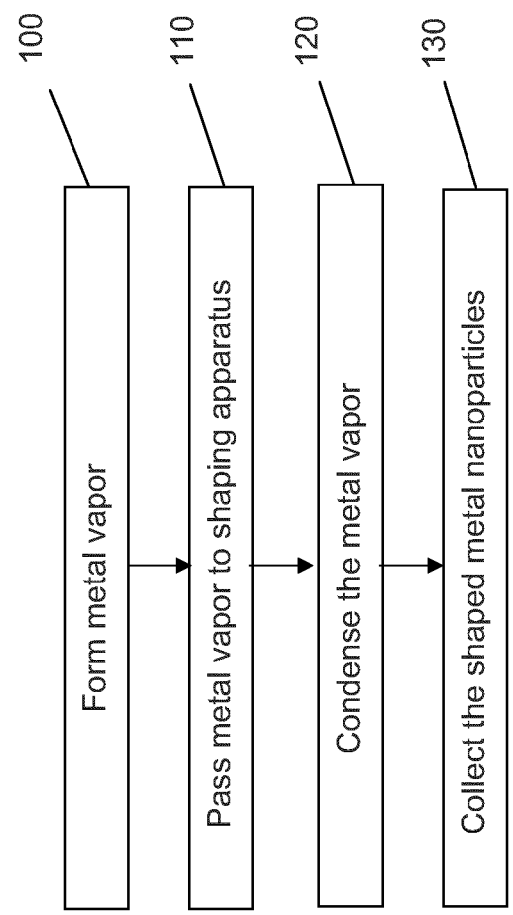
FIG. 1 depicts a method for preparing shaped nanoparticles in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

One challenge in the creation of metal nanoparticle inks is forming the required very large number of covalent intermetallic bonds while reducing or eliminating spaces or voids within the final printed metallic structure. One limitation to achieving this goal is the geometric shape of the metal nanoparticles. In traditional metal nanoparticle formation processes, the formed metal nanoparticles have a generally "spherical" shape. Printed "spherical" metal nanoparticles have large voids within the printed patterns when packed together, and thus do not pack efficiently. As a result "holes" or "gaps" are present within the printed metallic conductor produced from the curing process. These "holes" or "gaps" lead to higher electrical resistivities/lower electrical conductivity within the final conductor. Accordingly, metal nanoparticles having shapes that pack more tightly (and thus eliminate such "holes" or "gaps") are advantageous. Examples of metal nanoparticles that pack more tightly include, but are not limited to, cubic-shaped metal nanoparticles.

FIG. 1 depicts a method for preparing shaped nanoparticles in accordance with an illustrative embodiment. In an operation 100, a metal vapor is formed. In an embodiment, the metal vapor is formed by heating a bulk metal to a temperature sufficient to vaporize at least a portion of the bulk metal. Depending on the type of bulk metal, the bulk metal may be heated from room temperature to over 3,000 degrees Celsius. In accordance with such an embodiment, the bulk metal may be heated in a conventional oven, an electric arc furnace, or other heating device. In another embodiment, the bulk metal may be heated by applying a pulsed laser to the bulk metal. The pulsed laser may include a neodymium-YAG laser, a nitrogen laser, an argon laser, a carbon dioxide laser, a helium-neon laser, an excimer laser, a dye laser, a ruby laser, an ytterbium-doped glass laser, an infrared laser, or any other suitable laser known to those of skill in the art. In other embodiments, the bulk metal may be heated by any manner known to those of skill in the art. In an embodiment, the bulk metal may include copper, silver, aluminum, lanthanide metals (e.g., cerium through lutetium on the periodic table), transition metals (e.g., scandium through zinc, yttrium though cadmium, and lanthanum through gold on the periodic table), indium, tin, antimony, tellurium, selenium, thallium, bismuth, actinides, uranium, thorium, neptunium, or any other suitable metal known to those of skill in the art capable for use in a metallic nanoparticle.

In an operation 110, the metal vapor is passed to a shaping apparatus. In an embodiment, the metal vapor is passed from the heating area to the shaping apparatus by a mechanical pumping system. In other embodiments, a vacuum may be formed to pass the metal vapor to the shaping apparatus. Such a vacuum may be formed by keeping the heating area at a low pressure while introducing an inert gas. The combination of the low pressure and the inert gas flow moves the metal vapor to the shaping apparatus. In still another embodiment, the shaping apparatus may be located above the heating area so that as the metal vapor rises as a result of its heating, the metal vapor is passed to the shaping apparatus. In other embodiments, the metal vapor may be passed to the shaping apparatus in any manner known to those of skill in the art.

In an operation 120, the metal vapor is condensed within the shaping apparatus to form selectively-shaped metal nanoparticles. Cooling of the metal vapor causes condensation. In an embodiment, the metal vapor may be condensed in an inert gas. The inert gas may include oxygen, helium, neon, argon, krypton, xenon, nitrogen, or any other suitable gas known to those of skill in the art.

The metal vapor may be condensed in various shaping apparatuses. For example, in a first embodiment, the shaping apparatus may include a mesh separator as discussed in more detail below with reference to FIGS. 3 and 4. In an embodiment, the mesh separator includes a plurality of nano-sized or micron-sized pores that are selectively shaped so that as the metal vapor passes through the pores, the metal vapor will condense at least in part within the pores and assume the shape of the pores. In an embodiment, the sizes of the pores may be in the nanoparticle size range, ranging from about 5 nanometers (nm) to about 100 nm in length. In another embodiment, the sizes of the pores may be in the micron size range, ranging from about 100 nm to several microns in length.

The mesh separator restricts the flow of the metal vapor, allowing the metal nanoparticles to be formed within its pores. In an embodiment, the pores are square-shaped with sides approximately 100 nanometers in length. However, in other embodiments, the pores may have any desired shape or size. The mesh separator may include molybdenum, tungsten, or any other material known to those of skill in the art with a melting point temperature higher than the vaporization temperature of the metal vapor. In an embodiment, the mesh separator may include a wire mesh or a woven wire cloth as available from the Ferrier Wire Company (located Toronto, Ontario, Canada) or Hillside Wire Cloth Company (located in Belleville, N.J., USA).

In another embodiment, the shaping apparatus includes a plurality of shaping cups configured to capture the metal vapor as discussed in more detail below with reference to FIGS. 6 and 7A-7D. The respective cups include an opening on one side through which metal vapor may enter the respective shaping cup and accumulate within a recess within the shaping cup. Upon entering the shaping cup, the metal vapor condenses and conforms to the shape of the shaping cup. In an embodiment, the respective shaping cups are square-shaped with sides approximately 100 nanometers in length. However, in other embodiments, the shaping cups may have any desired shape or size. The plurality of shaping cups may be formed from molybdenum, tungsten, or any other material known to those of skill in the art with a melting point temperature higher than the vaporization temperature of the metal vapor.

In an embodiment, the plurality of shaping cups are connected to a rotation mechanism that is configured to rotate the plurality of shaping cups to facilitate condensation of the metal vapor and recovery of the condensed metal nanoparticles. In accordance with such an embodiment, the plurality of shaping cups are positioned such that the plurality of shaping cups are able to receive the metal vapor being passed from the heating area. Condensation of the metal vapor within the plurality of shaping cups may occur while the shaping cups are oriented in this position. In an embodiment, this position may be a face-down position such that the plurality of shaping cups face the heating area/heating element and are able to receive the metal vapor rising from the heating area/heating element.

After receiving the metal vapor, the plurality of shaping cups may then be rotated to a position such that the plurality of shaping cups face at least partially away from the incoming metal vapor, such that the condensed metal nanoparticles may be removed from the plurality of shaping cups. In an embodiment, this position may be a face-up position such that the plurality of shaping cups face away from the heating area.

In an operation 130, the shaped metal nanoparticles are collected. In an embodiment, a vacuum is formed to pass the shaped metal nanoparticles to a collection vessel. Such a vacuum may be formed by maintaining the reaction vessel at a low pressure while introducing an inert gas. In an embodiment, the low pressure includes pressure of about $10^{-6}$ torr or less. The combination of the low pressure and the inert gas flow produces a vacuum/flow that moves the shaped metal nanoparticles to the collection vessel. In alternative embodiments, the shaped metal nanoparticles may be collected via magnetic attraction or via electrostatic attraction or repulsion created by attachment of electrons from an electron beam.

In an embodiment, the inert gas includes oxygen, which is introduced to the reaction vessel and directed toward the shaping apparatus. The introduction of the oxygen causes an oxide coating to form on the shaped metal nanoparticles and on the surfaces of the shaping apparatus. Weak metal oxide to metal oxide interactions between the shaped metal nanoparticles and the surfaces of the shaping apparatus facilitate rapid release of the shaped metal nanoparticles from the shaping apparatus.

In still another embodiment, the size of the shaped metal nanoparticles may be manipulated to facilitate collection. Larger nanoparticles are typically less reactive than smaller nanoparticles. Thus, the release of larger shaped metal nanoparticles from the shaping apparatus will occur more readily than the release of smaller shaped metal nanoparticles. In an embodiment, the molecular mass of an inert gas may be increased in order to increase the size of the metal nanoparticles formed from the metal vapor. Examples of inert gases and their corresponding atomic masses include Helium, 4; Neon, 20; Argon, 40; Krypton, 83.8; Xenon, 131.3; and Nitrogen, 28.

In addition, the size of the pores of the shaping apparatus may be modified to promote creation of shaped metal nanoparticles of a desired size. In an embodiment, the shaped metal nanoparticles are produced having a size of approximately 100 nanometers in height. In another embodiment, the sizes of the pores may range from about 5 nanometers (nm) to about 100 nm in length. In still another embodiment, the sizes of the pores may be in the micron size range, ranging from about 100 nm to several microns in length.

In yet another embodiment, the shaping apparatus may be vibrated via a vibration mechanism to further facilitate separation of the shaped metal nanoparticles from the shaping apparatus. In an embodiment, the vibration mechanism may include a ratchet-type device configured to shake the shaping apparatus. In an embodiment, the shaping apparatus includes a plurality of rotating cups, and the vibration mechanism is configured to shake the plurality of rotating cups as they rotate. In another embodiment, the vibration mechanism is configured to vibrate continuously during formation of the metal nanoparticles.

Figure 2:
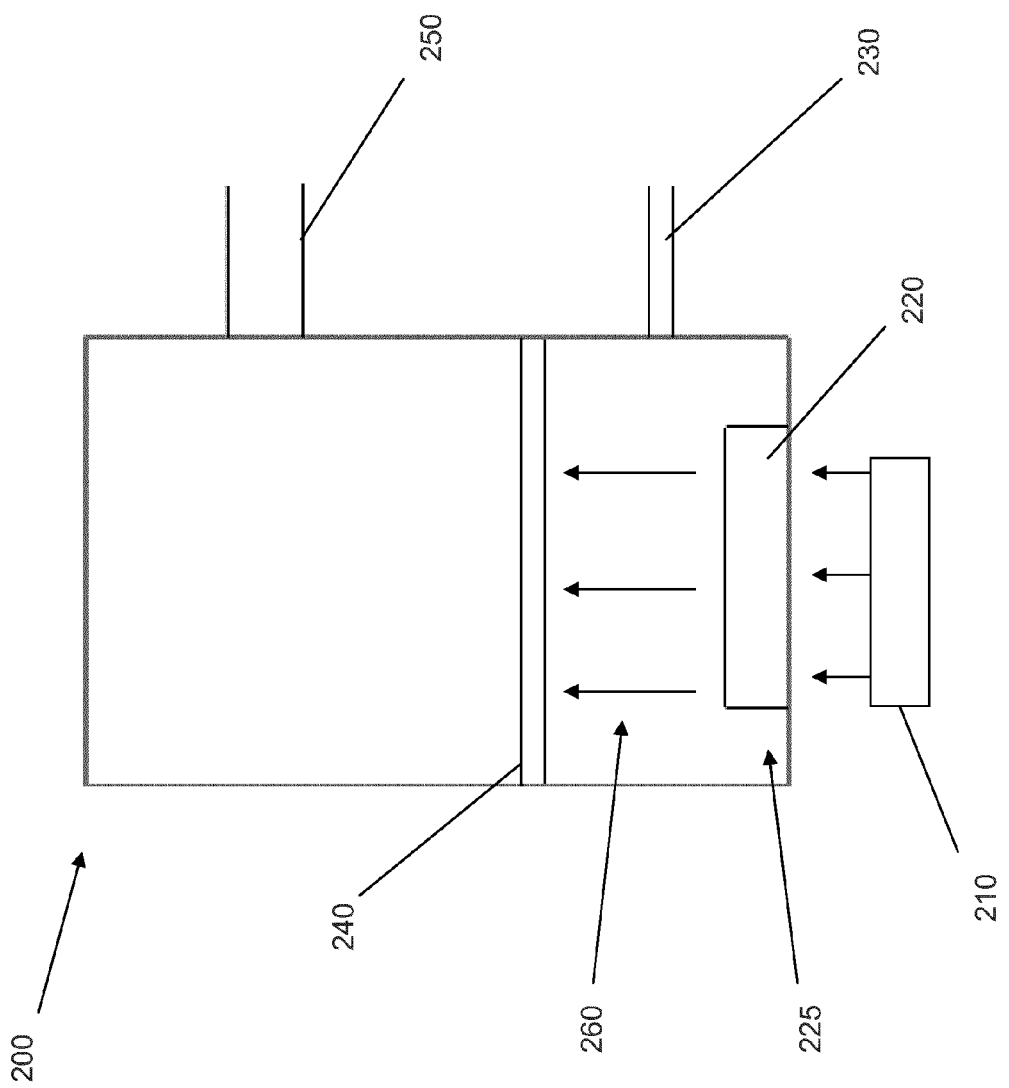
FIG. 2 depicts a reaction vessel in accordance with an illustrative embodiment.

FIG. 2 depicts a reaction vessel 200 in accordance with an illustrative embodiment. Reaction vessel 200 includes a heat source 210 that is configured to heat a bulk metal 220 in a heating area 225. Depending on the type of bulk metal, bulk metal 220 may be heated from room temperature to over 3,000 degrees Celsius. In an embodiment, heat source 210 is a conventional oven, an electric arc furnace, or another heating component known to those of skill in the art. In an embodiment, heat source 210 is configured to heat bulk metal 220 from room temperature to over 3,000 degrees Celsius. In another embodiment, heat source 210 may include a laser configured to emit a pulsed laser at the bulk metal. The pulsed laser may include a neodymium-YAG laser, a nitrogen laser, an argon laser, a carbon dioxide laser, a helium-neon laser, an excimer laser, a dye laser, a ruby laser, an ytterbium-doped glass laser, an infrared laser, or any other suitable laser known to those of skill in the art. In other embodiments, heat source 210 may include any other heating device known to those of skill in the art.

Bulk metal 220 may include copper, silver, aluminum, lanthanide metals (e.g., cerium through lutetium on the periodic table), transition metals (e.g., scandium through zinc, yttrium though cadmium, and lanthanum through gold on the periodic table), indium, tin, antimony, tellurium, selenium, thallium, bismuth, actinides, uranium, thorium, neptunium, or any other suitable metal known to those of skill in the art capable for use in a metallic nanoparticle. In an embodiment, the amount of bulk metal 220 used may depend on the design of heat source 210 and reaction vessel 200, and may range from a few pounds of bulk metal 220 (for single batch loads) to several hundred pounds of bulk metal 220 (for continuous feed reactors).

As bulk metal 220 is heated via heat source 210, metal vapor is formed and moves toward a shaping apparatus 240, as indicated by arrows 260. The height of shaping apparatus 240 above heating area 225 may be adjusted to optimize the production of the shaped metal nanoparticles.

Reaction vessel 200 includes an inlet port 230 that is configured to inlet an inert gas and direct the inert gas toward shaping apparatus 240. The inert gas facilitates cooling and condensation of the metal vapor into metal nanoparticles, and facilitates the rapid release of shaped metal nanoparticles from shaping apparatus 240. In an embodiment, the inert gas includes oxygen. In other embodiments, the inert gas may include helium, neon, argon, krypton, xenon, nitrogen, or any other suitable gas known to those of skill in the art. The introduction of oxygen may cause an oxide coating to form on the shaped metal nanoparticles and on the surfaces of shaping apparatus 240. Weak metal oxide to metal oxide interactions between the shaped metal nanoparticles and the surfaces of the shaping apparatus facilitate rapid release of the shaped metal nanoparticles from shaping apparatus 240.

In an embodiment, the inert gas is leaked into reactor vessel 200 continually throughout the conversion of the bulk metal into shaped metal nanoparticles. The higher the pressure of the inert gas the shorter the mean free path of the forming metal nanoparticles. Accordingly, in an embodiment, the inert gas is maintained at a low pressure, e.g., less than about 1 torr. In an embodiment, this low pressure is maintained by balancing the leak-in rate of the inert gas with the dynamic vacuum continually evacuating reaction vessel 200.

Shaping apparatus 240 includes shaping components that are configured to shape the metal vapor as it cools and condenses to form shaped metal nanoparticles. Shaping apparatus 240 may include various shaping components depending on the particular configuration. For example, in a first embodiment, shaping apparatus 240 includes a mesh separator as discussed in more detail below with reference to FIGS. 3 and 4. In an embodiment, the mesh separator includes a plurality of nano-sized pores that are selectively shaped so that as the metal vapor passes through the pores, the metal vapor will condense at least in part within the pores and assume the shape of the pores. The mesh separator restricts the flow of the metal vapor, allowing the metal nanoparticles to be formed within its pores. In an embodiment, the pores are square-shaped with sides having a length of about 100 nanometers. However, in other embodiments, the pores may have any desired shape and size. The mesh separator may include molybdenum, tungsten, or any other material known to those of skill in the art with a melting point temperature higher than the vaporization temperature of the metal vapor.

In another embodiment, shaping apparatus 240 includes a plurality of shaping cups configured to capture the metal vapor as discussed in more detail below with reference to FIG. 6. The respective shaping cups include an opening on one side through which metal vapor may enter the respective shaping cup. Upon entering the shaping cup, the metal vapor condenses and conforms to the approximate shape of the shaping cup. In an embodiment, the respective shaping cups are square-shaped. However, in other embodiments, the shaping cups may have any desired shape. For example, such shapes may also include rectangular shapes or diamond shapes. In an embodiment, square-shaped cups may be created by configuring the cups such that lengths of the edges of the square holes are the same length as the wire thickness used to create the square cups. Rectangular-shaped cups may be fabricated using different thickness wire or by weaving the mesh with two different edge lengths. Diamond shaped cups may be similarly fabricated as square or rectangular-shaped cups, except the angles within the shape will no modified such that they are not 90 degrees. The plurality of shaping cups may be formed from molybdenum, tungsten, or any other material known to those of skill in the art with a melting point temperature higher than the vaporization temperature of the metal vapor.

In an embodiment, the plurality of shaping cups are connected to a rotation mechanism that is configured to rotate the plurality of shaping cups to facilitate condensation of the metal vapor and recovery of the condensed metal nanoparticles. The rotation mechanism may include a rotating spindle or any other suitable rotation mechanism known to those of skill in the art. In various embodiments, the rotation mechanism may be belt driven using an electric motor, air driven using a vane and a spindle (i.e., an axle), driven via a rotating magnetic drive, driven via a heat generated rotation drive, driven via a peristaltic pump drive, or driven via any other suitable mechanisms known to those of skill in the art.

In an embodiment, the rotation mechanism is configured to continually rotate the plurality of shaping cups during the heating operation of reaction vessel 200. The rotation time may depend on the rate at which the metal nanoparticles are being formed. For example, bulk metal having an initial preheating temperature closer to or above the melting point of the bulk metal will result in more rapid metal nanoparticle formation, and therefore a greater rotation rate will be required. Conversely, bulk metal having a lower initial pre-heating temperature that is well below the melting point of the bulk metal will result in slower metal nanoparticle formation, and therefore will allow for a slower rotation rate. If laser or electric arc discharge heating methods are used the rotation rate can be matched with the rate of the laser pulse or the electric arc discharge rate or sequence.

In an alternative embodiment, the rotation mechanism may be controlled by a computing device such that it is configured to rotate at predetermined intervals. Such predetermined intervals may be set as desired by an operator of the system.

In accordance with such an embodiment, the plurality of rotating shaping cups are positioned such that the plurality of shaping cups are able to receive the metal vapor being passed from heating area 225. Condensation of the metal vapor within the plurality of shaping cups may occur while the shaping cups are oriented in this position. In an embodiment, this position may be a face-down position such that the plurality of shaping cups face heating area 225 and are able to receive the metal vapor rising from heating area 225. In alternative embodiments, the rotating shaping cups need not be oriented in a "face down" configuration with respect to heating area 225, but may be oriented in any position such that the openings of the rotating shaping cups face a flow of metal vapor allowing for the accumulation of metal vapor within the openings of the shaping cups.

After receiving the metal vapor, the plurality of shaping cups may then be rotated to a position such that the plurality of shaping cups face at least partially away from the incoming metal vapor, wherein the condensed metal nanoparticles may be removed from the plurality of shaping cups. In an embodiment, this position may be a face-up position such that the plurality of shaping cups face away from heating area 225. In alternative embodiments, the rotating shaping cups need not be rotated to a "face up" position, but may be oriented in any position such that the opening of the shaping cups face generally away from the flow of metal vapor, thereby allowing for the removal and collection of condensed metal nanoparticles from the plurality of shaping cups.

Reaction vessel 200 further includes an outlet 250 that is configured to pass the shaped metal nanoparticles from reaction vessel 200 to a collection area.

Figure 3:
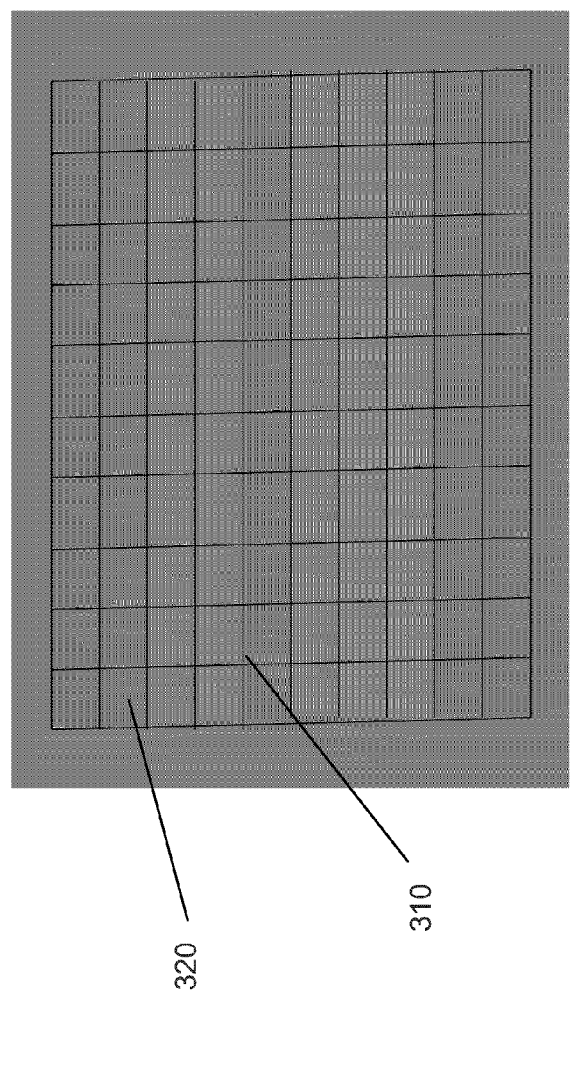
FIG. 3 depicts a mesh separator in accordance with an illustrative embodiment.

FIG. 3 depicts a mesh separator 300 in accordance with an illustrative embodiment. Mesh separator 300 includes a wire mesh 310 and a plurality of nano-sized pores 320 that are selectively shaped so that as the metal vapor passes through the pores, the metal vapor will condense at least in part within the pores and assume the shape of the pores. Mesh separator 300 restricts the flow of the metal vapor, allowing the metal nanoparticles to be formed within pores 320. In an embodiment, pores 320 are square-shaped with sides having a length of approximately 100 nanometers. However, in other embodiments, pores 320 may have any desired shape or size. Wire mesh 310 may be formed from molybdenum, tungsten, or any other material known to those of skill in the art with a melting point temperature higher than the vaporization temperature of the metal vapor which will be received at mesh separator 300. In an embodiment, mesh separator 300 may include a wire mesh or a woven wire cloth as available from the Ferrier Wire Company or Hillside Wire Cloth Company.

Figure 4:
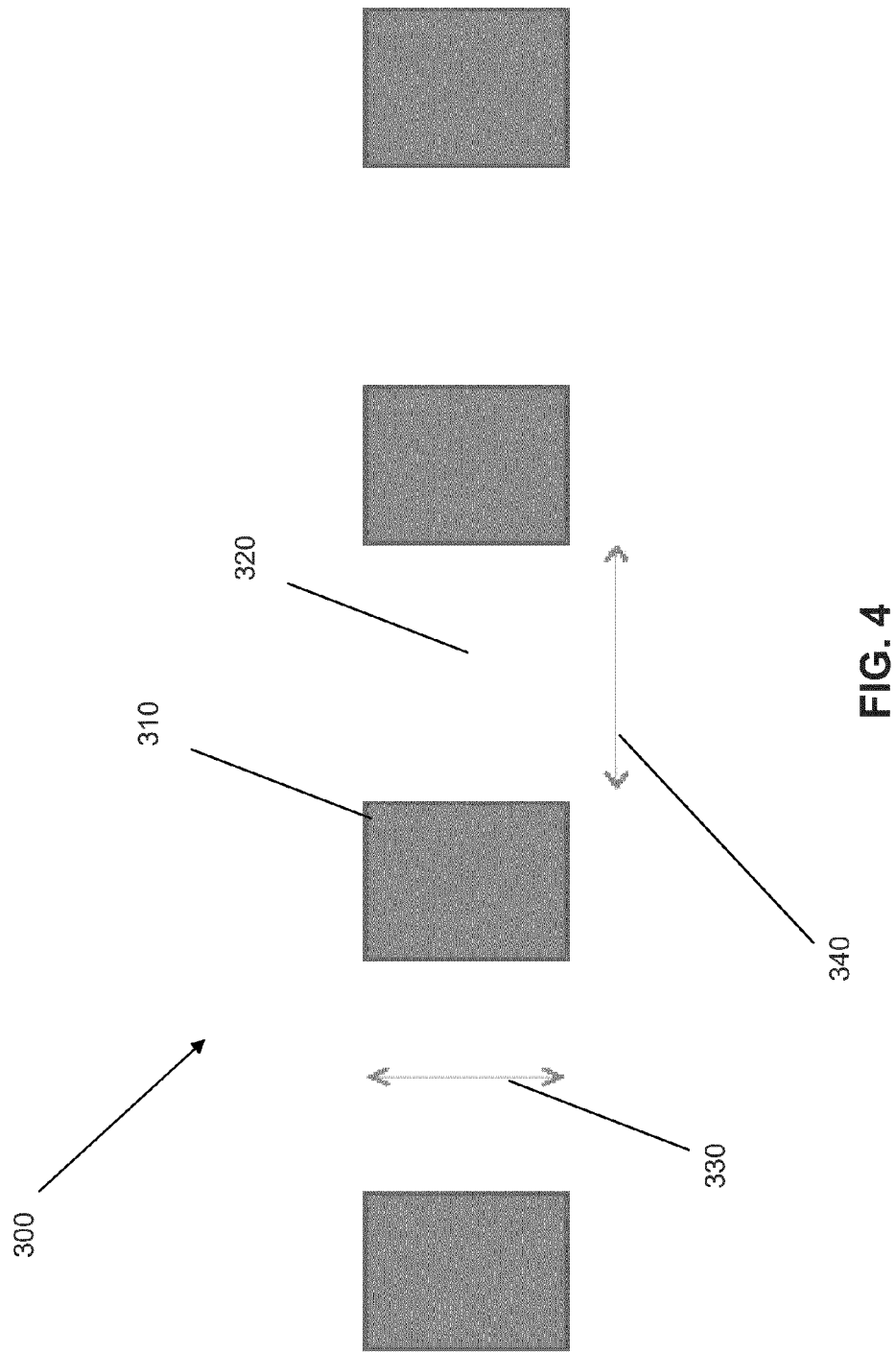
FIG. 4 depicts a cross-sectional view of a mesh separator in accordance with an illustrative embodiment.

FIG. 4 depicts a cross-sectional view of mesh separator 300 in accordance with an illustrative embodiment. As discussed above, mesh separator 300 includes wire mesh 310 and a plurality of nano-sized pores 320. Pores 320 have a depth 330 and a width 340. Depth 330 and width 340 may be selected as desired to control the shape of the condensed metal nanoparticles. In an embodiment, depth 330 and width 340 will be approximately equal in order to form square-shaped metal nanoparticles. In alternative embodiments, depth 330 and width 340 may be modified such that metal nanoparticles of any desired shape may be formed. In an embodiment, both depth 330 and width 340 may range from between about 5 nanometers (nm) to about 100 nm in length. In another embodiment, both depth 330 and width 340 may range from about 100 nm to several microns in length.

Figure 5:
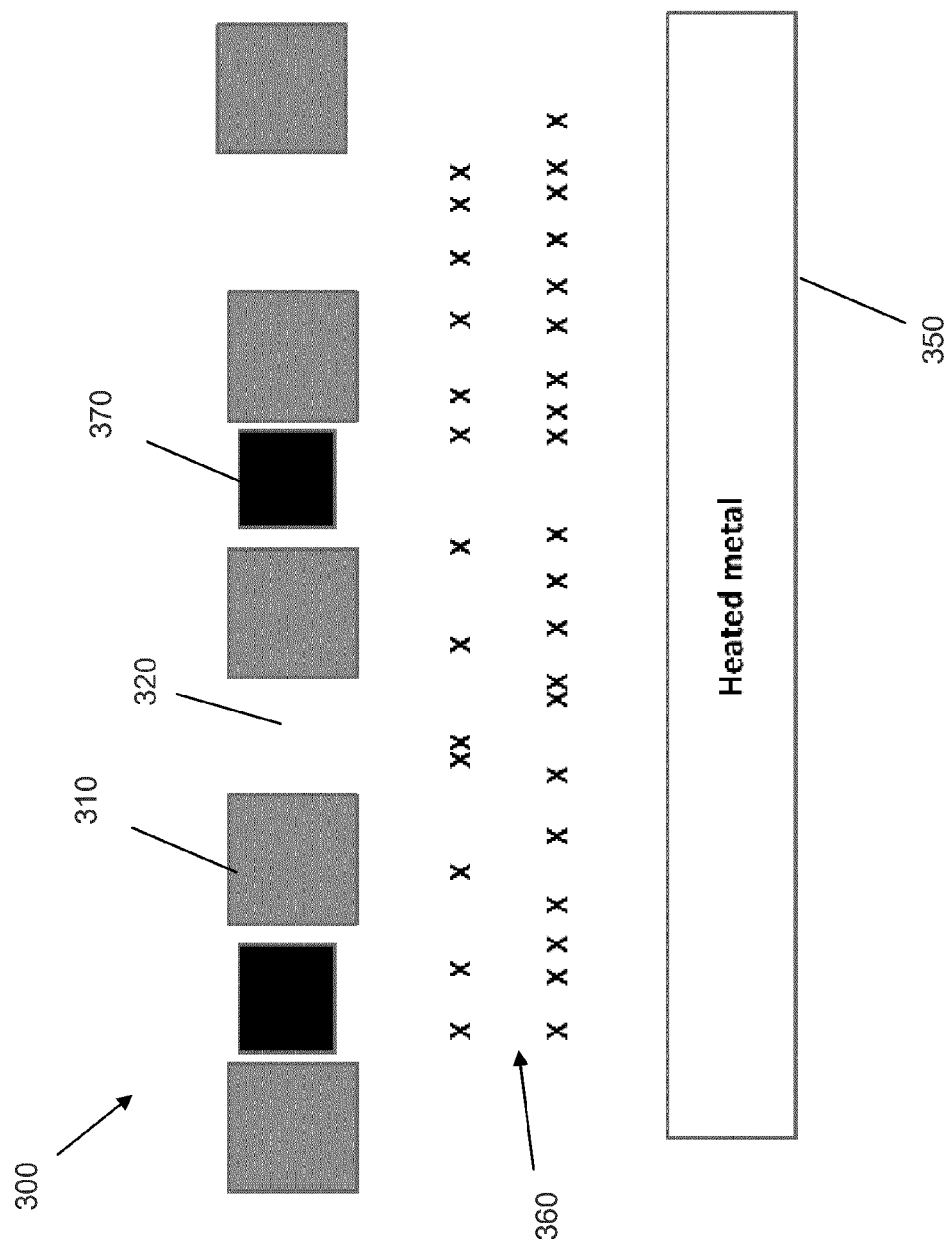
FIG. 5 depicts a mesh separator during operation in accordance with an illustrative embodiment.

FIG. 5 depicts mesh separator 300 during operation in accordance with an illustrative embodiment. A metal 350 is heated forming a metal vapor 360. As metal vapor 360 rises it passes into pores 320 of mesh separator 300. As metal vapor 360 cools and passes through pores 320, metal vapor 360 condenses to form shaped metal nanoparticles 370. Shaped metal nanoparticles 370 thereby acquire a shape dictated by the dimensions and shape of pores 320.

Figure 6:
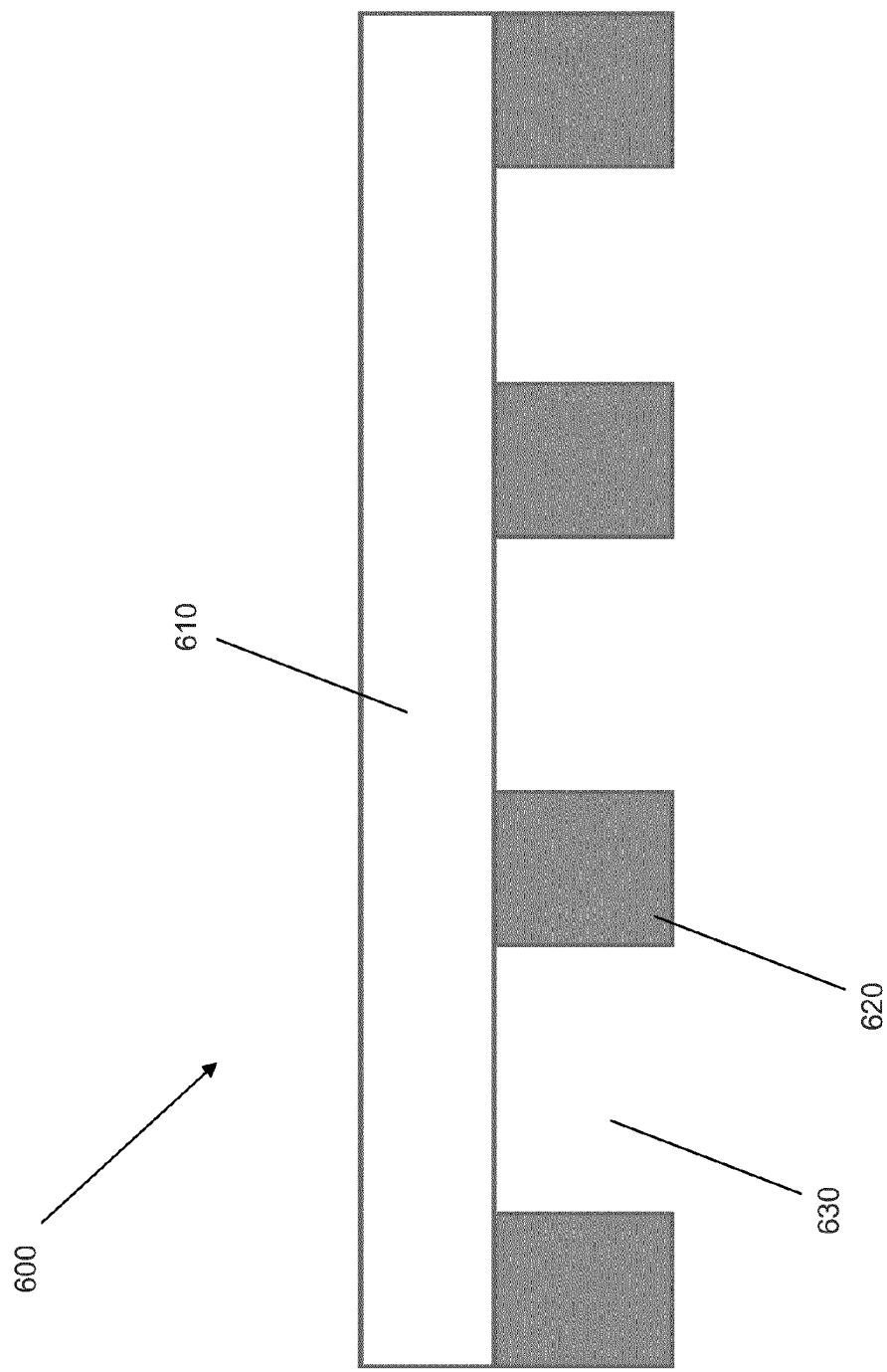
FIG. 6 depicts a set of shaping cups in accordance with an illustrative embodiment.

FIG. 6 depicts a set of shaping cups 600 in accordance with an illustrative embodiment. Set of shaping cups 600 includes an end plate 610 that is connected to a plurality of walls 620. A plurality of cup-shaped recesses 630 are thereby formed and encompassed by end plate 610 and respective walls 620 as illustrated in FIG. 6. The design of shaping cups 600 allows the metal vapor received from the heated metal to better aggregate within recesses 630 since the metal vapor is not able to pass through recess 630 (as it may with the pores of the mesh separator described above with reference to FIGS. 3 and 4). Such a design may provide better overall shape and dimension control of the metal nanoparticles.

End plate 610 and walls 620 may be formed from molybdenum, tungsten, or any other material known to those of skill in the art with a melting point temperature higher than the vaporization temperature of the metal vapor which will be received within shaping cups 600. In an embodiment, recesses 630 will have a depth of about 100 nm and a width of about 100 nm, thus facilitating the formation of cubic metallic nanoparticles having sides of approximately 100 nm in length. In alternative embodiments, shaping cups 600 may be designed to facilitate formation of any desired shape of nanoparticle. In an embodiment, recesses 630 will have a depth and a width ranging from between about 5 nanometers (nm) to about 100 nm in length. In another embodiment, recesses 630 may have both a depth and width that range from about 100 nm to several microns in length.

In an embodiment, shaping cups 600 may be fabricated by attaching end plate 610 to a mesh separator as described above with respect to FIGS. 3 and 4. End plate 610 may be attached to the mesh separator by welding, by a clamping mechanism, or in any other manner apparent to those of skill in the art. In addition, shaping cups 600 may be connected to a rotation mechanism as discussed below to facilitate collection of the metal nanoparticles formed within recesses 630.

Figure 7C:
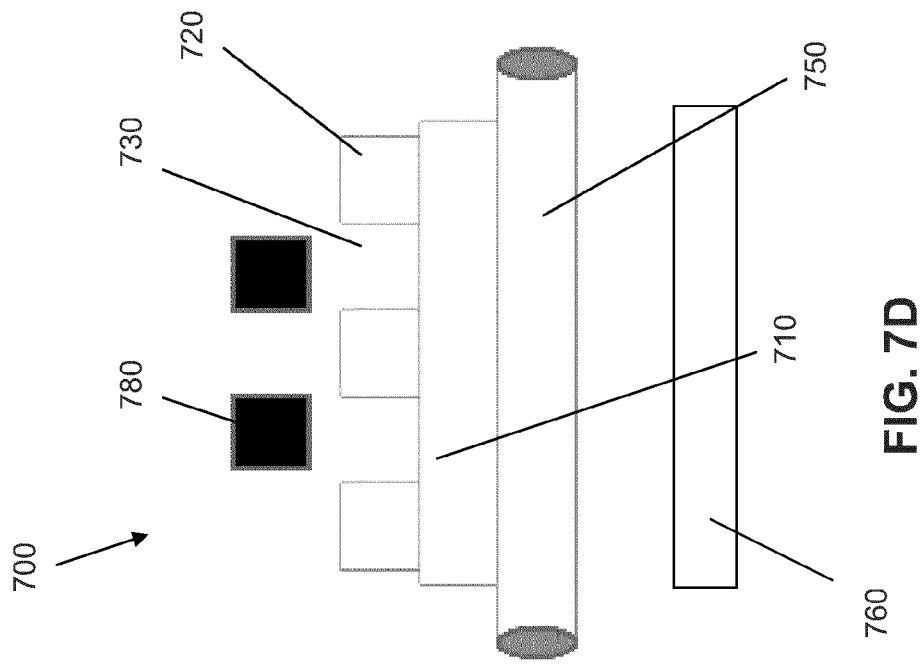

FIGS. 7A-7D depict a set of rotating shaping cups 700 in accordance with an illustrative embodiment. FIG. 7A depicts a set of rotating cups 700 in a face down position such that rotating cups 700 face a flow of metal vapor 770 generated from a heated metal 760. Shaping cups 700 include an end plate 710 that is connected to a plurality of walls 720. A plurality of cup-shaped recesses 730 are thereby formed and encompassed by end plate 710 and respective walls 720. The design of shaping cups 700 allows metal vapor 770 received from heated metal 760 to collect within recesses 730. In addition, the design of shaping cups 700 allows shaping cups 700 to be placed very close to heated metal 760 since very small particles of metal vapor 770 are not able to pass through the cups (as compared to the mesh separator embodiment, wherein very small particles of metal vapor 770 may be able to pass through the pores without condensing and/or conforming to the shape of the pores).

A rotation mechanism 750 is connected to end plate 710 and is configured to rotate shaping cups 700. In an embodiment, rotation mechanism 750 is configured to rotate shaping cups 700 from a generally face down position with respect to the flow of metal vapor 770 to a generally face up position, wherein shaping cups 700 face away from the flow of metal vapor 770. Rotation mechanism 750 may include a rotating spindle or any other suitable rotation mechanism known to those of skill in the art. In various embodiments, rotation mechanism 750 may be belt driven using an electric motor, air driven using a vane and a spindle (i.e., an axle), driven via a rotating magnetic drive, driven via a heat generated rotation drive, driven via a peristaltic pump drive, or driven via any other suitable mechanisms known to those of skill in the art. In alternative embodiments, rotating cups 700 need not be oriented in a "face down" configuration with respect to heated metal 760, but may be oriented in any position such that recesses 730 of rotating cups 700 face a flow of metal vapor 770 thereby enabling the accumulation of metal vapor 770 within recesses 730.

FIG. 7B depicts the set of rotating cups 700 in a face down position wherein metal vapor 770 has accumulated within recesses 730 and condensed to form metallic nanoparticles 780. In an embodiment, the condensation rate of metal vapor 770 is rapid, e.g., less than one second, but may be varied based on the amount of heat applied to heated metal 760. In another embodiment, the amount of heat applied to heated metal 760 may be selectively varied such that metal vapor 770 is condensed to form metallic nanoparticles 780 between about 0.1 seconds and about 2 seconds. The rotation rate of rotating cups 700 may be designed to mirror the condensation rate. For example, in the above described embodiment, the rotation rate of rotating cups 700 may be between about 0.1 seconds and about 2 seconds.

FIG. 7C depicts the set of rotating cups 700 in a face up position wherein the set of rotating cups has been rotated from a face down position to the face up position by rotation mechanism 750. In alternative embodiments, rotating cups 700 need not be rotated to a "face up" position, but may be oriented in any position such that recesses 730 of rotating cups 700 face generally away from the flow of metal vapor 770, thereby allowing for the removal and collection of condensed metal nanoparticles 780 from recesses 730. In an embodiment, rotating cups 700 are rotated such that they face a collection device that is configured to remove and collect condensed metal nanoparticles 780. The time it takes for rotating cups 700 to complete a rotation (i.e., the rotation time) may depend on the rate at which metallic nanoparticles 780 are formed. For bulk metals having an initial temperature closer to or at the melting point of the bulk metal will result in more rapid metallic nanoparticle formation, and therefore a higher rotation rate of rotating cups 700 will be required. In an embodiment, if laser or electric arc discharge heating methods are used the rotation rate of rotating cups 700 may be matched with the rate of the laser pulse or the electric arc discharge rate or sequence.

Figure 7D:
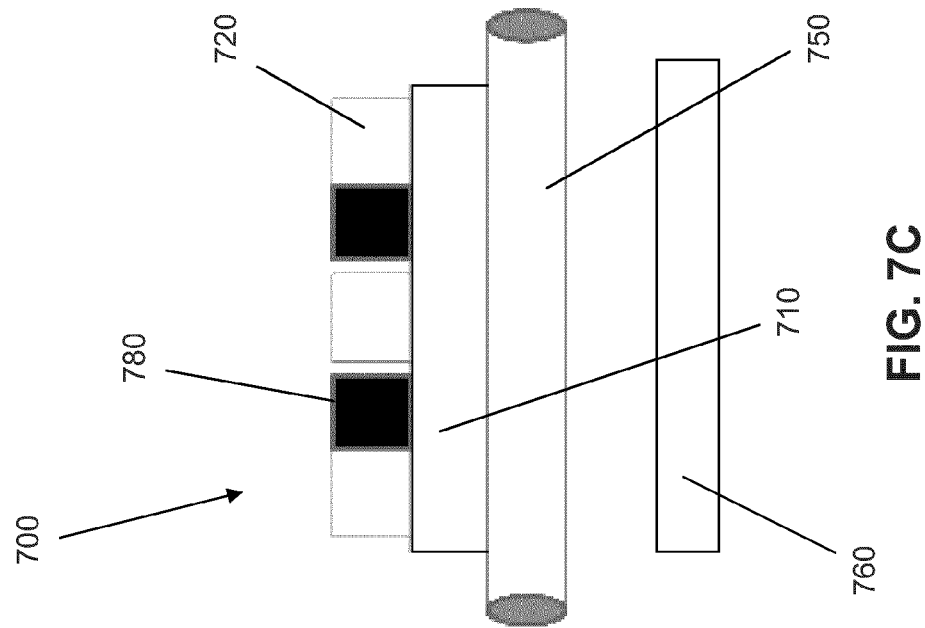

FIG. 7D depicts the set of rotating cups 700 in a face up position wherein metal nanoparticles 780 are being collected from recesses 730. In an embodiment, metal nanoparticles 780 may be transferred to a collection vessel by way of any transfer mechanism known to those of skill in the art. Collection of metal nanoparticles 780 may be facilitated in several ways. For example, in a first embodiment, a vacuum may be formed to pass metal nanoparticles 780 to a collection vessel. Such a vacuum may be formed by maintaining the reaction vessel in which rotating cups 700 are located at a low pressure while introducing an inert gas. The combination of the low pressure and the inert gas flow produces a vacuum/flow that moves metal nanoparticles 780 from rotating cups 700 to the collection vessel.

In an embodiment, the inert gas includes oxygen, which is introduced to the reaction vessel and directed toward rotating cups 700. The oxygen causes an oxide coating to form on metal nanoparticles 780 and on the surfaces of rotating cups 700. Weak metal oxide to metal oxide interactions between metal nanoparticles 780 and the surfaces of rotating cups 700 facilitate rapid release of metal nanoparticles 780 from rotating cups 700.

In still another embodiment, the size of metal nanoparticles 780 may be manipulated to facilitate collection. Larger nanoparticles are typically less reactive than smaller nanoparticles. Thus, the release of larger shaped metal nanoparticles from rotating cups 700 will occur more readily than the release of smaller shaped metal nanoparticles. In an embodiment, the molecular mass of an inert gas may be increased in order to increase the size of metal nanoparticles 780 formed from metal vapor 770. In addition, the size of recesses 730 may be modified to promote creation of metal nanoparticles 780 having a desired size.

In yet another embodiment, rotating cups 700 may be vibrated via a vibration mechanism to further facilitate separation of metal nanoparticles 780 from rotating cups 700. According to such an embodiment, rotation mechanism 750 may include a rotating spindle that is connected to a cog wheel that is configured to impart vibration to rotating cups 700 as they are rotated. In another embodiment, the vibration mechanism may include a ratchet-type device configured to shake the shaping apparatus. In an embodiment, the vibration mechanism is configured to shake the rotating cups 700 as they rotate. In another embodiment, the vibration mechanism is configured to vibrate continuously during formation of the metal nanoparticles.

After collection of metal nanoparticles 780 from recesses 730, the metal nanoparticle condensing process may be repeated by the rotation of rotating cups 700 back to the face down position such that metal vapor 770 may again be collected within recesses 730 and condensed into metal nanoparticles 780.

Example 1

Nickel Nanoparticle Formation with a Resistance Wire Heat Source and Square Mesh Shaping Apparatus A reaction vessel is provided with dimensions of approximately 4 to 5 feet in diameter, and a height of approximately 4 to 5 feet. The reaction vessel includes valves connected to a high vacuum pump capable of achieving a vacuum pressure of approximately $10^{-6}$ torr or lower, and of introducing an inert gas of helium at a pressure of 1 torr or lower. The reaction vessel includes a ceramic bowl having a bottom with a heat source. The heat source includes a tungsten resistance wire connected to an electrical power supply and is configured supply sufficient heat to vaporize bulk nickel metal (melting point 1452 degrees Celsius). The ceramic bowl contains a load (5 pounds) of nickel in the form of pellets, shavings, and/or pieces of metal. A tungsten square mesh is located within the reaction vessel above the ceramic bowl. The square mesh is used to control the shape of the nickel nanoparticles as they form and pass toward a collection vessel. Upon heating, the forming nickel nanoparticles will be carried through the holes in the mesh and into the collection vessel by a combination of the gas flow from the helium inlet and a valve connected to the dynamic vacuum near the collection vessel. The tungsten square mesh is vibrated throughout the production batch run to assist in the passage of the nickel nanoparticles through the mesh. Passage through the mesh may also be aided by introducing oxygen at a low pressure (1 torr or lower) into the reaction vessel. The introduction of oxygen facilitates creation of a thin nickel oxide layer onto the surface of the nickel nanoparticles, thereby preventing or minimizing aggregation or agglomeration between the respective nickel nanoparticles or between the nickel nanoparticles and the hot tungsten wire in the square mesh.

Example 2

Copper Nanoparticle Formation with an Electric Arc Heat Source and a Rotating Cup Shaping Apparatus A reaction vessel is provided with dimensions of approximately 6 to 8 feet in diameter, and a height of approximately 5 to 6 feet. The reaction vessel includes valves connected to a high vacuum pump capable of achieving a vacuum pressure of approximately $10^{-6}$ torr or lower, and of introducing an inert gas of argon at a pressure of 1 torr or lower. The reaction vessel includes a ceramic bowl having a bottom with a heat source. The heat source includes an electric arc heating device and is configured supply sufficient heat to vaporize bulk copper metal (melting point 1084 degrees Celsius). The ceramic bowl contains a load (500 pounds) of copper in the form of pellets, shavings, and/or pieces of metal. A set of rotating tungsten shaping cups is located within the reaction vessel above the ceramic bowl. The shaping cups are used to control the shape of the copper nanoparticles as they form and pass toward a collection vessel. Upon heating, the forming copper nanoparticles will be carried into recesses of the rotating shaping cups. As the shaping cups rotate, the copper nanoparticles assume the shape of the recesses of the shaping cups and then are released toward the collection vessel. A combination of the gas flow from the argon inlet and a valve connected to the dynamic vacuum near the collection vessel facilitate the movement of the shaped copper nanoparticles form the shaping cups to the collection vessel. Passage of the shaped copper nanoparticles may also be aided by introducing oxygen at a low pressure (1 torr or lower) into the reaction vessel. The introduction of oxygen facilitates creation of a thin copper-oxide layer onto the surface of the copper nanoparticles, thereby preventing or minimizing aggregation or agglomeration between the respective copper nanoparticles or between the copper nanoparticles and the hot tungsten metal in the shaping cups.

Example 3

Silver Nanoparticle Formation with a Pulsed Laser Heat Source and a Square Mesh Shaping Apparatus A reaction vessel is provided with dimensions of approximately 2 to 3 feet in diameter, and a height of approximately 2 to 3 feet. The reaction vessel includes valves connected to a high vacuum pump capable of achieving a vacuum pressure of approximately $10^{-6}$ torr or lower, and of introducing an inert gas of nitrogen at a pressure of 1 torr or lower. The reaction vessel includes a ceramic bowl having a bottom with a heat source. The heat source includes a pulsed nitrogen laser and is configured supply sufficient heat to vaporize bulk silver metal (melting point 962 degrees Celsius). The ceramic bowl contains a load (0.5 pounds) of silver in the form of pellets, shavings, and/or pieces of metal. A tungsten square mesh is located within the reaction vessel above the ceramic bowl. The square mesh is used to control the shape of the silver nanoparticles as they form and pass toward a collection vessel. Upon heating, the forming silver nanoparticles will be carried through the holes in the mesh and into the collection vessel by a combination of the gas flow from the nitrogen inlet and a valve connected to the dynamic vacuum near the collection vessel. The tungsten square mesh is vibrated throughout the production batch run to assist in the passage of the silver nanoparticles through the mesh. Passage through the mesh may also be aided by introducing oxygen at a low pressure (1 torr or lower) into the reaction vessel. The introduction of oxygen facilitates creation of a thin silver-oxide layer onto the surface of the silver nanoparticles, thereby preventing or minimizing aggregation or agglomeration between the respective silver nanoparticles or between the silver nanoparticles and the hot tungsten wire in the square mesh.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for preparing shaped nanoparticles, the method comprising:
    heating a bulk metal to produce a metal vapor;
    passing the metal vapor to a shaping apparatus, wherein the shaping apparatus comprises a mesh separator; and
    condensing the metal vapor within the shaping apparatus to form selectively-shaped metal nanoparticles, wherein the condensing the metal vapor comprises condensing the metal vapor at least in part within pores of the mesh separator as the metal vapor passes through the pores of the mesh separator;
    wherein the heating the bulk metal is performed within a heating area, and wherein the heating area and the shaping apparatus are located within a same reaction vessel.

2. The method of claim 1, wherein the heating the bulk metal comprises applying a pulsed laser to the bulk metal.

3. The method of claim 1, wherein the mesh separator comprises molybdenum.

4. The method of claim 1, wherein the mesh separator comprises a plurality of nano-sized, square-shaped pores.

5. The method of claim 4, further comprising passing the condensing metal vapor through the plurality of nano-sized, square-shaped pores of the mesh separator such that the selectively-shaped metal nanoparticles are formed at least in part within the plurality of nano-sized, square-shaped pores of the mesh separator.

6. The method of claim 1, wherein the selectively-shaped metal nanoparticles are square-shaped.

7. The method of claim 1, further comprising introducing oxygen gas to the metal vapor and the shaping apparatus to form an oxide coating on at least one of a surface of the shaping apparatus or the selectively-shaped metal nanoparticles.

8. The method of claim 1, further comprising vibrating the shaping apparatus to facilitate release of the selectively-shaped metal nanoparticles from the shaping apparatus during or after the condensing.

9. The method of claim 1, wherein the condensing the metal vapor comprises cooling the metal vapor within an inert gas at low pressure.

10. The method of claim 1, wherein the selectively-shaped metal nanoparticles have a length between about 5 nanometers and about 5 microns.

11. The method of claim 1, wherein the selectively-shaped metal nanoparticles have a nonspherical shape.

12. The method of claim 1, wherein the shaping apparatus is positioned above the heating area, and wherein the passing the metal vapor to the shaping apparatus comprises the metal vapor rising from the heating area to the shaping apparatus during the heating.

13. The method of claim 1, further comprising collecting the selectively-shaped metal nanoparticles from the shaping apparatus.

* * * * *